United States Patent [19]

Messersmith et al.

[11] Patent Number: 5,461,296
[45] Date of Patent: Oct. 24, 1995

[54] BUMPLESS ROTATING START

[75] Inventors: David M. Messersmith, Kenosha; David J. Gritter, Racine, both of Wis.

[73] Assignee: Eaton Corporation, Cleveland, Ohio

[21] Appl. No.: 94,784

[22] Filed: Jul. 20, 1993

[51] Int. Cl.$^6$ ................................................ H02P 3/18
[52] U.S. Cl. ........................ 318/779; 318/801; 318/808
[58] Field of Search ........................ 318/778, 779–782, 318/798–801, 807–808, 810, 811

[56] References Cited

U.S. PATENT DOCUMENTS

| | | | |
|---|---|---|---|
| 4,371,823 | 2/1983 | Lohest | 318/705 |
| 4,371,824 | 1/1983 | Gritter | 318/811 X |
| 4,379,325 | 4/1983 | Krampe et al. | 318/808 X |
| 4,417,193 | 11/1983 | Hirata | 318/806 X |
| 4,451,112 | 5/1984 | Hattori et al. | 318/778 |
| 4,468,603 | 8/1984 | Vander Meer et al. | 318/779 |
| 4,734,634 | 3/1988 | Kito et al. | 318/808 X |
| 4,767,976 | 8/1988 | Mutoh et al. | 318/808 |
| 4,958,269 | 9/1990 | Gritter | 318/808 X |
| 4,990,844 | 2/1991 | Gritter et al. | 318/762 |
| 4,994,950 | 2/1991 | Gritter | 318/211 X |
| 5,045,988 | 9/1991 | Gritter et al. | 318/803 X |
| 5,298,838 | 3/1994 | Peters et al. | 318/138 |

OTHER PUBLICATIONS

"Introduction to Field Orientation and High Performance AC Drives", Coeditors D. W. Novotny and R. D. Lorenz, Presented Oct. 6–7 at the 1985 IEEE Industry Applications Society Annual Meeting, Toronto, Canada.

"Adjustable Frequency AC Drives Application Guide", Eaton Corporation, Application Notes 53–4032–R, Oct. 1992.

"Adjustable Frequency AC Drives Application Guide", Eaton Corporation, Application Notes 53–4032–H, Nov. 1992.

"Electric Drive Applications Guide", Dynamatic, Rev. 1992 Ed., pp. 1–65.

*Primary Examiner*—Brian Sircus
*Attorney, Agent, or Firm*—Andrus, Sceales, Starke & Sawall

[57] ABSTRACT

A method for starting an unexcited, multiple phase, alternating current induction motor rotating at an unknown speed is provided. The method includes generating an output signal with an AC drive at a predetermined frequency in order to energize the motor. The output signal has independently adjustable frequency and voltage components. A speed reference is provided which is functionally related to the frequency of the output signal. The voltage of the output signal is ramped at a predetermined rate and the frequency of the output signal is adjusted such that the voltage of the output signal equals the motor's set point and the speed reference is substantially equal to the speed of the motor. The motor then enters the normal operating mode.

9 Claims, 2 Drawing Sheets

BUMPLESS ROTATING START

BACKGROUND AND SUMMARY OF THE INVENTION

This invention relates to the starting of an AC motor and, in particular, the invention provides a method of restarting an AC motor, while the shaft is spinning, without waiting for the shaft to stop.

An AC drive is a system for controlling the speed of an AC motor by controlling the frequency of the power supplied to the motor. The basic AC drive system consists of an ordinary three phase induction motor, an adjustable frequency controller and an operator's control station.

The adjustable frequency controller is comprised of an inverter section which uses solid state switches to convert DC power to stepped waveform AC power. A waveform generator produces switching signals for the inverter under control of a microprocessor.

The operator's station contains push buttons for starting and stopping the motor and a speed setting potentiometer or other means for setting the motor speed. The operator's control functions can be performed by a variety of automatic control systems.

After an inverter fault or a power outage, the shaft of the motor continues to rotate. It is often times desirable to restart the drive system without waiting for the shaft to stop. In the case of a power outage, the inverter will be disabled until sufficient input power is present. If, at that time, the shaft is still rotating, it is desirable for the drive system to be restarted without waiting for the shaft to stop.

The method to which the invention relates accomplishes the restarting function by adjusting the frequency of an output signal generated by the inverter such that the frequency of the output signal is substantially equal to the frequency of the power needed to be applied to the AC motor in order for the motor to maintain the shaft spinning at its present speed. The voltage and the frequency of the output signal are controlled independently by two reference signals generated by the microprocessor to govern the switching signals produced by the waveform generator for the inverter.

The method comprises initializing the voltage reference signal such that the inverter outputs zero volts to the motor. The frequency reference signal is preset. The voltage reference signal is gradually increased so as to increase the voltage applied to the motor. As the voltage to the motor is increased, the output signal from the inverter approaches a predetermined volts per hertz ratio. The predetermined volts per hertz ratio being the optimum voltage required by the motor at a given frequency. In addition, as the voltage of the output signal of the inverter is increased, the drive will begin to increase output current.

As the current from the inverter is increased, the drive goes into a current limit mode if the motor draws too much current, as is known. The present invention is further responsive to a current limit circuit when the drive goes into current limit thereby causing the frequency reference signal to reduce the frequency of the output signal of the inverter. As the frequency of the output signal of the drive is reduced, the drive will come out of current limit. When the drive comes out of current limit, the frequency of the output signal generated by the drive is substantially equal to the frequency needed by the motor to maintain its present motor speed. If, at this point, the voltage of the output signal has not increased to a level substantially equal to the established rated volts per hertz ratio of the motor, the voltage reference signal continues to increase the voltage of the output signal generated by the inverter. Once the output signal of the inverter is substantially equal to the motor's set point, normal operation of the motor is resumed.

If the inverter does not go into current limit, the frequency of the output signal of the drive is substantially equal to the frequency needed by the motor to maintain its present motor speed and no additional action by the frequency reference signal is required. In this case, normal operation will be resumed once the voltage reference signal has brought the voltage component of the output signal of the drive to the motor's set point.

DETAILED DESCRIPTION OF THE PREFERRED EMBODIMENT

Figure 1:
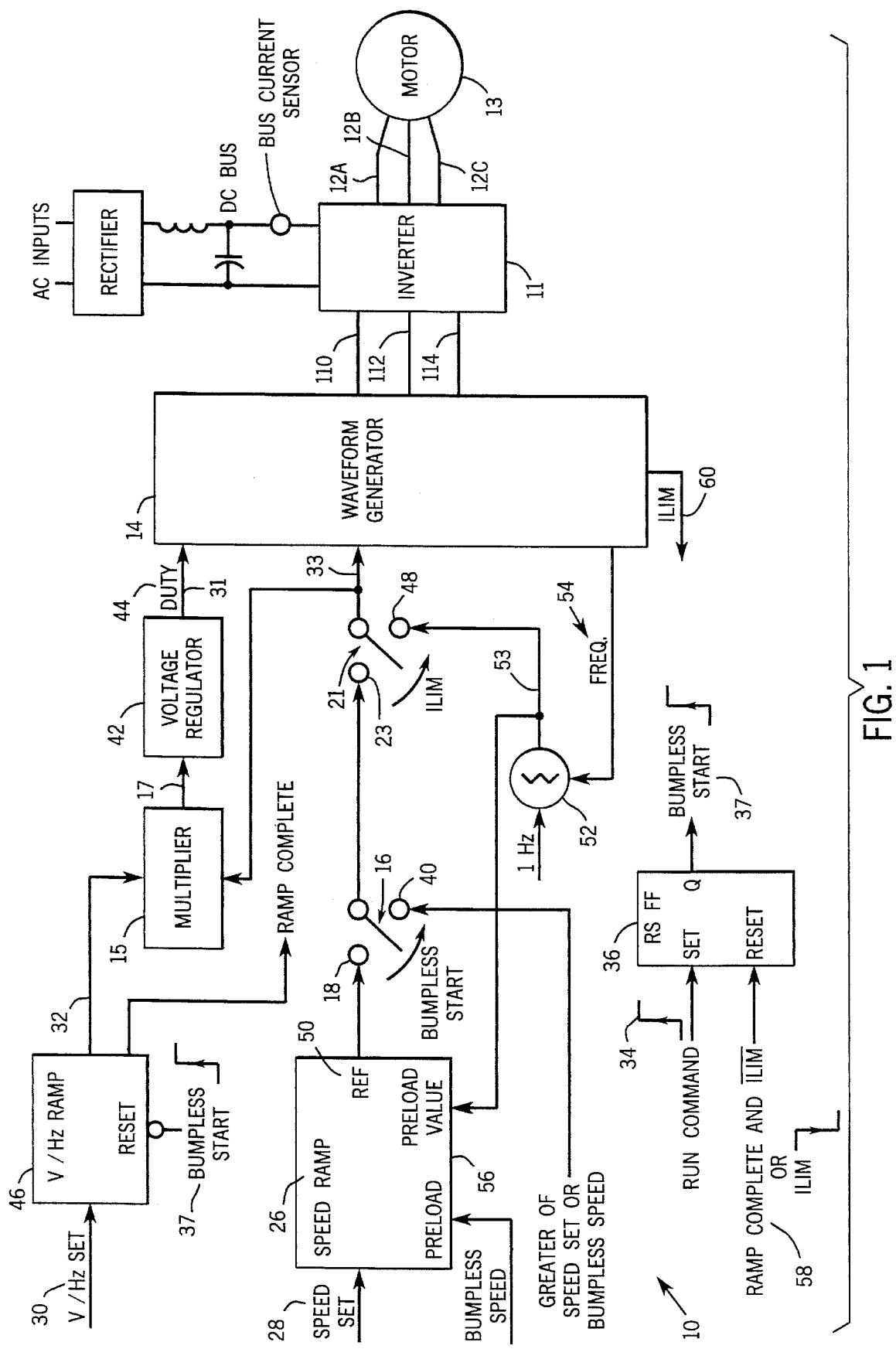
FIG. 1 is a block diagram of the method for starting an AC motor according to the present invention.

This invention relates to a method for starting an unexcited, multiple-phase, alternating current induction motor with an AC drive while the motor is rotating.

The present invention incorporates an AC drive having circuitry for monitoring currents in a DC bus that energize a motor. The waveform generator adjusts the frequency and the voltage of energization signals supplied by the inverter to the motor until the current falls within a predetermined range. A prior art AC drive having a motor control circuit that is integrated with a programmable motor speed control is disclosed in U.S Pat. No. 4,958,269 to Gritter. This patent is assigned to the assignee of the present invention and is incorporated herein by reference. To facilitate understanding, elements common to both the present invention and the U.S. Pat. No. 4,958,269 will be referred to by the same reference character.

FIG. 1 shows a block diagram of the AC drive generally designated by the reference numeral 10 for use in conjunction with this invention. The AC drive 10 is comprised of an inverter 11, a waveform generator 14 and an AC motor 13. The AC drive system 10 converts three phase, 60 hertz input power to an adjustable frequency and voltage source for controlling the speed of the AC motor 13. Bus lines 110, 112, and 114 interconnect the waveform generator 14 and the inverter 11. A flip-flop 36 is provided to allow for an external signal by the operator to initiate the program in the microprocessor.

Figure 2:
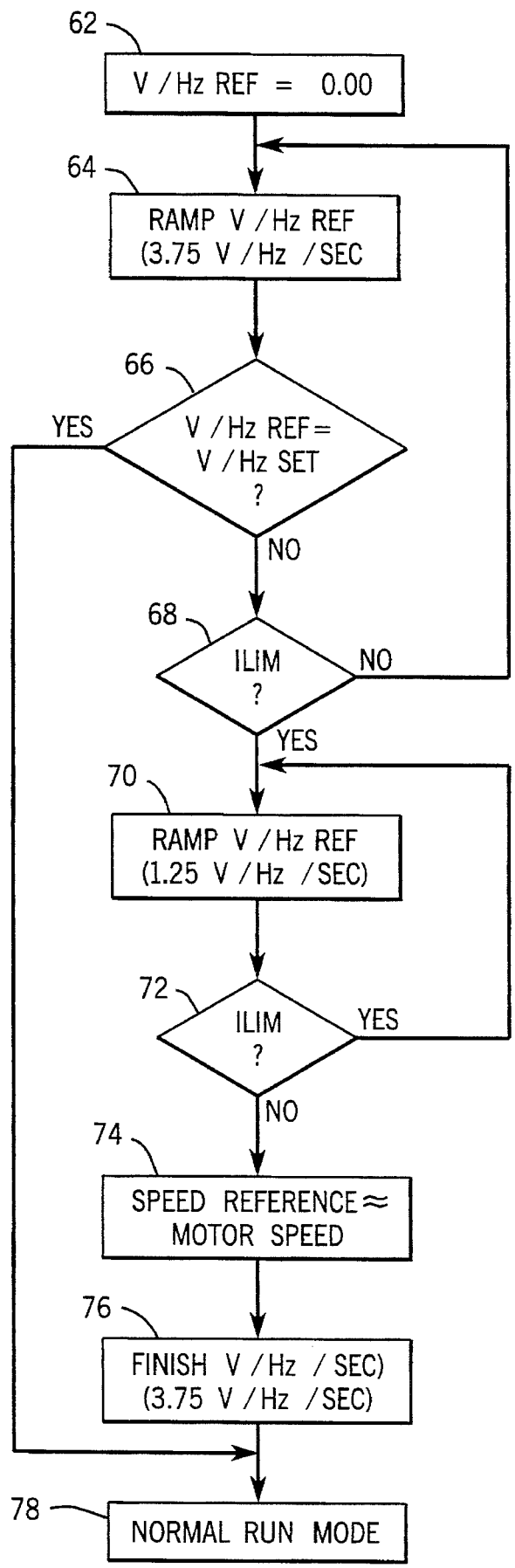
FIG. 2 is a flow diagram of the method for starting an AC motor according to the present invention.

The method to which this invention relates is implemented by the Intel 8096 microprocessor shown in U.S. Pat. No. 4,958,269. The microprocessor is programmed to execute the method of this invention upon an operator's command according to the functional blocks shown in FIG. 2, representing program steps.

The frequency of the power applied to an AC motor 13 determines the motor speed and is based on the following equation:

$$N = \frac{120F}{P}$$

where:
N= speed (rpm, revolutions per minute)
F= frequency (hertz)

P= number of poles of the motor

The number of poles is considered constant since this design characteristic is already manufactured into the motor. The AC drive 10 controls the frequency (F) and voltage applied to motor 13. The speed (N) of the motor 13 is then proportional to the supplied frequency.

Typically, an inverter 11 starts motor 13 by applying power at a very low frequency to motor 13 and increasing, at a defined rate, the frequency of the power up to a point where motor 13 is operating at a desired speed or set speed as it is commonly referred. In the typical scenario, waveform generator 14 increases the frequency applied to motor 13 to a point that the motor speed equals set speed 28. A prior art waveform generator and inverter are disclosed in U.S. Pat. No. 5,045,988 to Gritter et al. This patent is assigned to the assignee of the present invention and is incorporated herein by reference.

After an inverter fault or a power outage, the shaft of the motor 13 continues to spin at an unknown speed. The method of this invention is directed towards a means of restarting the AC motor 13 while the shaft is spinning.

A three-phase output signal across lines 12A, 12B, 12C is generated by AC drive 10 through inverter 11 to excite motor 13. The wave form generator 14, upon commands from the microprocessor, independently adjusts the voltage and the frequency of energization signals supplied by the inverter to the motor. These commands are hereafter referred to as the voltage reference signal and the frequency reference signal. FIG. 2 depicts in block diagram form the method executed by the microprocessor to restart AC motor 13 while the shaft of motor 13 is spinning.

Line 33 into waveform generator 14 corresponds to the frequency reference signal portion of the microprocessor program. The frequency reference signal controls the frequency of the output signal applied by the inverter 11 to the motor 13 such that the frequency component of the output signal is generally equal to the value of the frequency reference signal at line 33.

Line 31 into waveform generator 14 corresponds to the voltage reference signal portion of the microprocessor program. The voltage reference signal controls the voltage component of the output signal from the inverter 11 to the motor 13 such that the voltage component of the output signal from the inverter 11 to the motor 13 is generally equal to the value of the voltage reference signal at line 31.

The voltage reference signal at line 31 is generated by providing a volts per hertz reference signal 32 and multiplying the volts per hertz reference signal 32 by the frequency reference signal at line 33, as shown by multiplier 15. Since the frequency reference signal is measured in Hertz, the multiplication of the two signals produces a voltage signal at line 17. The signal at line 17 is regulated and fed into the waveform generator 14 at line 31, thereby becoming the voltage reference signal. As the volts per hertz reference signal is increased, the value of the voltage reference signal at line 31 increases and hence, the voltage component of the output signal from the inverter 11 also increases.

The volts per hertz set signal 30, FIG. 1, refers to a motor's standard operating voltage at its standard operating frequency, e.g. 460 volts at 60 hertz. Upon a run command signal 34 into RS flip-flop 36, a bumpless start signal 37 activates the microprocessor to execute the method of this invention. The volts per hertz reference signal 32 is initialized to zero such that the voltage reference signal at line 31 is zero and hence, the output signal from the inverter 11 applies no voltage to motor 13.

The initial value of the frequency reference signal at line 33 is determined by selecting the greater of the set speed 28 or the bumpless speed 38. The bumpless speed 38 is an operator selected starting speed for the motor 13. Each speed, the bumpless 38 and the set 28, has an individual frequency functionally related to that speed as per the above specified formula. Therefore, the initial value of the frequency reference signal is equal to the frequency functionally related to the selected speed. As previously described, the frequency of the output signal applied by the inverter 11 to the motor 13 at the initialization stage is generally equal to the value of the frequency reference signal at line 33. The speed functionally related to the value of the frequency reference signal, and hence the frequency of the output signal, is hereafter referred to as the speed reference 50.

In mechanical terminology, once the bumpless start sequence is initiated, switch 16 closes to terminal 40 and switch 21 closes to terminal 23. The frequency of the output signal generated by the inverter 11 to the motor 13 is then generally equal to the value of the frequency reference signal at line 33.

As shown in ramp box 46, the volts per hertz signal 32 is increased thereby increasing the voltage reference signal at line 31. The voltage regulator box 42 represents the process undertaken by the waveform generator 14 to insure that the voltage reference signal at line 31 is a precise value.

The duty cycle 44 refers to the voltage reference signal as a percentage of the maximum available inverter voltage. If the voltage reference signal ramps the output signal of the inverter 11 to such a level that the volts per hertz signal 32 is equal to the volts per hertz set 30, the ramping function 46 is complete and the motor 13 enters a normal operating mode, to be described.

If, while the voltage reference signal is ramping, the motor enters current limit, shown by line 60, switch 21 closes to terminal 48. In addition, if the motor 13 is in current limit 60, the value of the frequency reference signal and hence, the speed reference 50, is reduced as per the modulation output 22 from logic array 20 in the current control circuit of U.S. Pat. No. 4,958,269. This reduced frequency reference signal is signified by the feedback loop shown in FIG. 1 and generally designated by the reference numeral 54. The reduced frequency reference signal 54 is increased by one hertz by generator 52, and the value of the frequency at line 53 is stored in pre-load value 56.

When the motor 13 comes out of current limit as signified at 60, or if the voltage reference signal completes the ramping function signified by box 46, a signal 58 is generated by the microprocessor to reset the RS flip-flop 36, such that the bumpless start mode is exited. Upon exiting bumpless start, switch 16 closes to terminal 18 and switch 21 closes to terminal 23. At this point, the pre-load value 56 is substantially equal to the frequency of the power needed to be applied to the AC motor 13 in order for the motor 13 to maintain the shaft spinning at its present speed. In turn, the speed reference 50 is substantially equal to the present motor speed. The speed reference 50 is gradually increased to the set speed 28 as signified by speed ramp box 26, thereby gradually increasing the frequency of the power applied from the inverter 11 to the motor 13, as is done in the normal operating mode.

Referring to FIG. 2, step 62 shows the volts per hertz reference signal being initialized to zero such that the output signal from the inverter 11 applies no voltage to motor 13. The volts per hertz reference signal is ramped at a predetermined value, e.g. 3.75 volts per hertz per second, as shown in step 64, thereby increasing the voltage component of the output signal from the inverter 11 to the motor 13. The volts per hertz reference signal is then compared to the volts per hertz set point at step 66. If the volts per hertz reference signal is equal to the volts per hertz set point, the motor enters the normal operating mode at step 78.

If the volts per hertz reference signal does not equal the volts per hertz set point, it is determined whether the motor 13 is in current limit in step 68. If the motor is not in current limit, step 64 is repeated and the volts per hertz reference signal is once again ramped. If the motor 13 is in current limit, step 70 is performed and the volts per hertz reference signal is ramped at a slower predetermined rate, e.g. 1.25 volts per hertz per second.

In step 72, it is once again determined whether the motor 13 is in current limit. If the motor 13 is in current limit, step 70 is repeated and the voltz per hertz reference signal is ramped at the second, slower, predetermined rate. If the motor 13 is not in current limit, the speed reference 50, FIG. 1, is generally equal to the motor speed as depicted in step 74. In step 76, the volts per hertz reference signal is ramped to a point where the voltz per hertz reference signal is substantially equal to the volts per hertz set point. At that point, the motor 13 enters its normal run mode as shown in step 78.

It can be seen from the above description that various alternative embodiments are possible without departing from the spirit of the invention.

We claim:

1. A method for starting an unexcited, multiple phase, alternating current induction motor with an AC drive, the motor rotating at an unknown speed, comprising the steps of:

providing a predetermined set speed for the motor, the set speed having a corresponding frequency that is functionally related to the set speed;

providing a starting speed for the motor, the starting speed having a corresponding frequency that is functionally related to the starting speed;

selecting the greater of the set speed and the starting speed, and providing the same as a selected speed;

providing an operating reference;

providing an output signal to the motor in order to energize the motor and provide motor current, the output signal having an adjustable voltage and an adjustable frequency wherein the frequency of the output signal has an initial value generally equal to the frequency functionally related to the selected speed;

providing a volts per hertz reference signal, the volts per hertz reference signal functionally related to the voltage of the output signal;

initializing the volts per hertz reference signal;

ramping the volts per hertz reference signal at a first, predetermined rate so as to increase the voltage of the output signal; and comparing the volts per hertz reference signal with the operating reference such that if the volts per hertz reference signal is substantially equal to the operating reference, the motor enters normal operating mode.

2. The method of claim 1 wherein the output signal has a corresponding reference speed functionally related to the frequency of the output signal.

3. The method of claim 2 wherein if the volts per hertz reference signal is equal to a value other than the operating reference, executing the additional steps of:

providing a current control circuit for monitoring the motor current supplied to the motor;

comparing the motor current with a threshold, and if the motor current does not exceed the threshold, returning to the step of ramping the volts per hertz reference signal at a predetermined rate;

lowering the frequency of the output signal such that the reference speed approaches the motor speed;

ramping the volts per hertz reference signal at a second, predetermined rate;

comparing the reference speed with the speed of the motor, and if the speed of the motor is less than the reference speed, returning to the step of lowering the frequency of the output signal; and ramping the volts per hertz reference signal at a third, predetermined rate to such a level that the volts per hertz reference signal is substantially equal to the operating reference.

4. The device of claim 1 wherein the starting speed for the motor is operator selected.

5. A method for starting an unexcited, multiple phase, alternating current induction motor with an AC drive, the motor rotating at an unknown speed, comprising the steps of:

generating with the AC drive an output signal having independently adjustable frequency and voltage components in order to supply motor current to the motor and to energize the motor, the frequency component of the output signal having a corresponding speed reference that is functionally related to the frequency component of the output signal;

providing a predetermined set speed for the motor, the set speed having a corresponding frequency that is functionally related to the set speed;

providing a starting speed for the motor, the starting speed having a corresponding frequency that is functionally related to the starting speed;

selecting the greater of the set speed and the starting speed and providing same as a selected speed whereby the initial frequency component of the output signal is equal to the frequency that is functionally related to the selected speed;

providing a current control circuit for monitoring motor currents supplied to the motor;

comparing the motor current with a threshold;

generating a modulation output to reduce the frequency component of the output signal if the motor current exceeds the threshold; and increasing the voltage component of the output signal to a predetermined normal operating level for the motor.

6. A method for restarting an unexcited, multiple-phase, alternating current induction motor with an AC drive, the motor rotating at an unknown speed, comprising the steps of:

providing an output signal having an adjustable voltage, a predetermined frequency, and a corresponding reference speed functionally related to the frequency of the output signal, the output signal generated by the AC drive in order to energize the motor and to provide motor current;

providing a volts per hertz reference functionally related to the voltage of the output signal;

ramping the volts per hertz reference at a first predetermined rate so as to increase the voltage of the output signal; and comparing the volts per hertz reference to a predetermined operating reference such that if the volts per hertz reference is substantially equal to the operating reference, the motor enters a normal operating mode, and if the volts per hertz reference equals a value other than the operating reference, then further comprising the step of:

comparing the motor current with a threshold such that if the motor current does not exceed the threshold, returning to the step of ramping the volts per hertz reference, and if the motor current exceeds the threshold, then executing the additional steps of:

adjusting the frequency of the output signal such that the reference speed approaches the speed of the motor;

ramping the volts per hertz reference at a second predetermined rate; and comparing the reference speed to the speed of the motor such that if the reference speed is greater than the speed of the motor, returning to the step of adjusting the frequency of the output signal.

7. The method of claim 6 wherein if the reference speed is generally equal to the speed of the motor, executing the additional step of:

ramping the volts per hertz reference at a third predetermined rate to such a level that the output signal is substantially equal to the operating reference.

8. The method of claim 7 wherein the third predetermined rate is equal to the first predetermined rate.

9. The method of claim 8 wherein the second predetermined rate is less than the first predetermined rate.

* * * * *